United States Patent [19]

Kawai

[11] 4,410,920
[45] Oct. 18, 1983

[54] UNITARY MOUNTING MEANS FOR THE TAPE HANDLING COMPONENTS OF A VTR

[75] Inventor: Tsutomu Kawai, Yokosuka, Japan

[73] Assignees: Funai Electric Trading Co. Ltd., Osaka; Efuti Giken Co., Ltd., Yokohama, both of Japan

[21] Appl. No.: 218,096

[22] Filed: Dec. 19, 1980

[30] Foreign Application Priority Data

Dec. 27, 1979 [JP] Japan .......................... 54-184823[U]

[51] Int. Cl.$^3$ ...................... G11B 15/66; G11B 23/04; G11B 5/52
[52] U.S. Cl. .......................................... 360/85; 360/95
[58] Field of Search .................................. 360/81–85, 360/95, 130.32, 130.33

[56] References Cited

U.S. PATENT DOCUMENTS 3,939,491  2/1976  Shigeta .................................. 360/85
4,056,833  11/1977  Schulz ................................... 360/85

Primary Examiner—Alfred H. Eddleman
Assistant Examiner—Kin Wong
Attorney, Agent, or Firm—Fisher, Christen & Sabol

[57] ABSTRACT

A mechanism for mounting the electromagnetic transducers, erasing heads and some of the tape guiding means for a VTR which employs a rotating head consisting of a fixture which closely encircles the cylindrical housing of the video transducer so that when the other components are attached to the fixture, all of the components will be properly positioned with respect to each other and can be mounted on the chassis as a unit. One of the tape guides may be rotatably mounted on the fixture in order to assist in withdrawing the tape from a cassette.

6 Claims, 7 Drawing Figures

UNITARY MOUNTING MEANS FOR THE TAPE HANDLING COMPONENTS OF A VTR

BRIEF SUMMARY OF THE INVENTION

This invention relates to mechanisms for mounting the various components of a video tape recorder (VTR) of the type where magnetic tape is stored in a cassette and withdrawn therefrom to be wrapped in a helical path around the cylindrical housing of a video transducer head and at the same time brought into operative engagement with other components such as fixed erasing heads and a fixed audio transducer head. The mechanism comprises a fixture which includes a horizontal surface having a depending collar which closely encircles the housing of the video head and supports the other components in pre-positioned locations. A ring shaped member is rotatably mounted on the collar to reciprocally rotatably support a guide member used to withdraw tape from the cassette and guide the tape in operation. An inclined guide for another vertically reciprocable tape withdrawing guide means can also be pre-positioned on the fixture.

DETAILED DESCRIPTION OF A PREFERRED EMBODIMENT

In the video tape recorder disclosed in my prior co-pending application, Ser. No. 147,831 filed May 8, 1980, now Pat. No. 4,353,101, a magnetic tape is stored on supply and take-up reels in a cassette when not in use. For recording, or playback, a portion of the tape is withdrawn from the cassette by a take-out pin and a pinch roll, each of which is mounted on a ring-shaped member which encircles the generally drum-shaped housing of a video transducer head which is mounted adjacent the cassette. Other electrical elements such as a full-width erasing head, an audio transducer head, audio erasing head and capstan are all mounted on the side of the video transducer head away from the cassette. When the tape is withdrawn from the cassette the ring-shaped members rotate in opposite directions causing the take-out pin and pinch roller to wrap a portion of the tape approximately halfway around the drum-shaped housing in a helical path and to bring other portions of the tape into operative engagement with the full-width erasing head, the audio erasing head, audio transducing head and capstan in that order. When recording, or play back, is completed these operations are reversed and the tape is returned and the tape wound back on to one of the reels.

Figure 1:
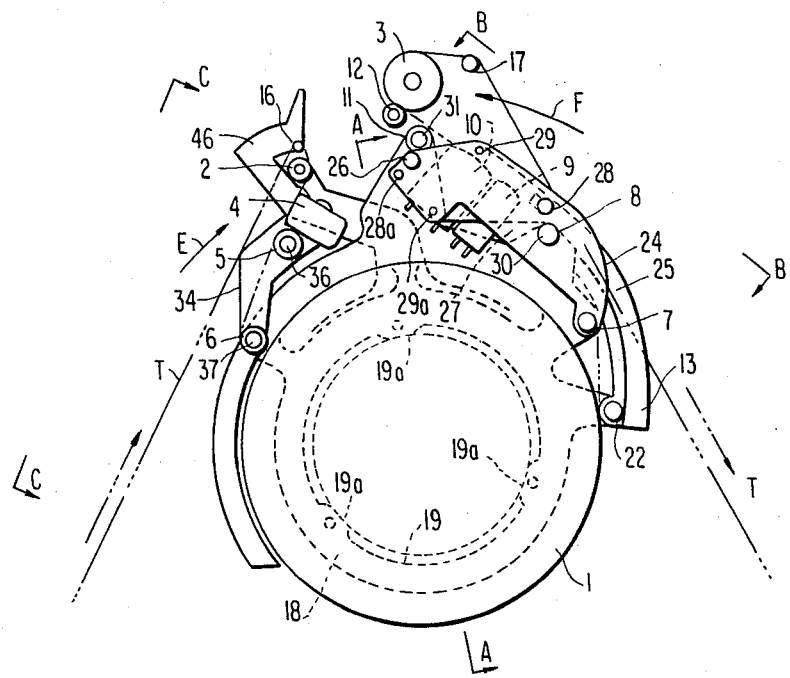
FIG. 1 is a plan view of the various tape handling elements of a video tape recorder incorporating a preferred form of mounted means according to this invention.

Thus, in FIG. 1, the cassette (not shown) containing the tape is located below the transducer housing 1 with the two reels disposed approximately the same distance away from opposite sides of a vertical line running through the center of transducer housing 1. The take-out pin 2 and pinch roller 3 are shown in their loaded, or fully drawn out, positions whereby the magnetic tape from the supply reel passes, in order, a guide pin 16, take-out pin 2, a full-width erasing head 4, a pair of guide pins 5 and 6, approximately halfway around the circumference of housing 1, upwardly around the outside of guide pins 7 and 8, an audio erasing head 9, an audio transducing head 10, a guide pin 11, between the capstan 12 and pinch roller 3 and around the outside of a guide pin 17 from which it returns to the take-up reel in the cassette.

As explained in said prior application, in their unloaded positions the take-out pin 2 and pinch roller 3 are disposed within the cassette behind respective portions of the tape. For loading the tape the take-out pin 2 moves in an arcuate path, indicated by arrow E, in a clockwise-direction and simultaneously pinch roller 3 moves in an arcuate counterclockwise direction, indicated by arrow F, to the positions shown in FIG. 1. Guide pins 16 and 17 can also be shifted, by means not shown, to positions which will prevent tape moving in one direction from scraping against tape moving in the opposite direction. At the same time, while the pinch roller is moving to its loaded position it is guided by an inclined guide plate 13 in an axially downward direction with respect to the housing 1 so that the tape will be laid in the tape guide 14, shown in FIG. 2, as being helically recessed in the circumference of housing 1. High speed revolution of the electromagnetic element 15 within the housing causes the tape to record or to reproduce a series of inclined video signals. Thus, in the loaded position of FIG. 1, the pinch roller 3 and the mechanisms associated with it are axially downwardly displaced with respect to the take-out pin 2 and its associated mechanisms.

Figure 3:
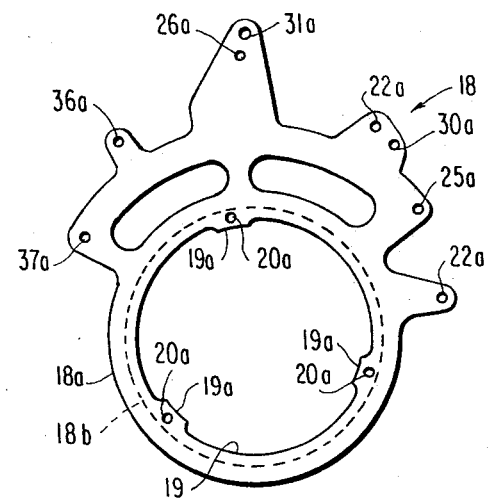
FIG. 3 is a plan view of the fixture.

FIG. 3 shows a mounting fixture, or substrate, indicated generally by numeral 18, upon which the fixed elements, which include guide pins 5,6,7,8 and 11, the full-width erasing head 4, the audio erasing head 9 and transducing head 10 are mounted on a horizontal chassis member 21 in correct relationship to the video transducing head 1. The fixture 18 consists of plate members 18a and 18b having identical configurations in plan view, superimposed one upon the other and provided with a central opening which surrounds the housing 1. The lower plate member 18b is provided with an integrally formed downwardly extending collar having a cylindrical outer surface 19 and the upper plate member 18a is provided on the inside with equi-angularly spaced axial extending ribs 19a whose inner surfaces are cylindrically formed for close-fitting engagement with the lower cylindrical portion of housing 1 to maintain it in position. Axially extending bores 20a are provided in the members 18a and 18b near the ribs 19a and screws 20 extend thorugh suitable openings in chassis 21 to have their threaded ends received on the underside of the upper portion of housing 1 to hold the fixture and the rotary transducer head firmly in place on chassis 21.

Figure 4:
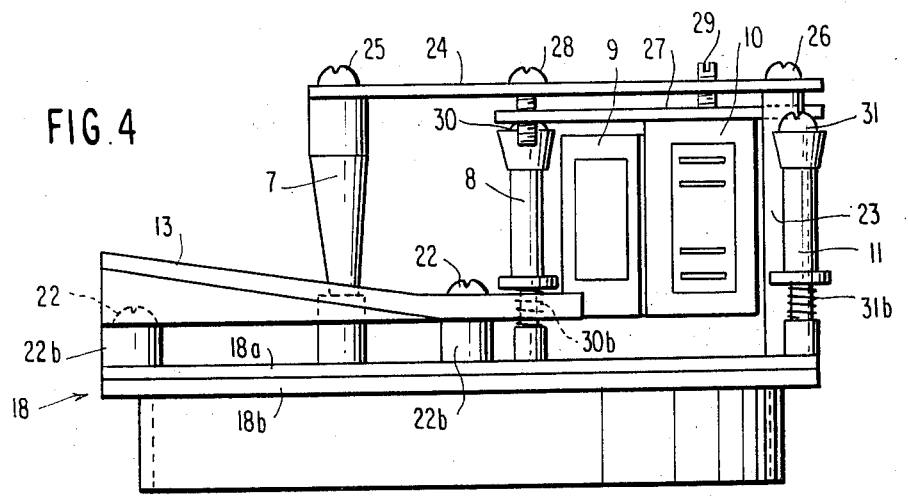
FIG. 4 is an enlarged fragmentary elevation along the line B—B of FIG. 1.

Further, as seen in FIGS. 3 and 4, the inclined guide 13 for lowering the pinch roller 3 as it moves to the loaded position, is attached by means of screws 22 which are received in threaded openings 22a in the fixture 18 to hold the guide at the proper level on spacers 22b. A horizontal plate 24 is mounted on top of guide pin 7 and another vertical pin 23 by means of screws 25 and 26 received in the respective openings 25a and 26a in fixture 18. The audio erasing head 9 and transducer head 10 are attached to the lower surface of another plate 27 which is adjustably supported from plate 24 by means of screws 28 and 28a (see FIG. 1) for controlling the vertical positions of these heads while their inclinations can be adjusted by a pair of screws 29 and 29a which are also received in threaded openings in plate 24. Guide pins 8 and 11 are supported by long axially extending screws 30 and 31 received in threaded openings 30a and 31a on fixture 18 while the springs 30b and 31b, placed below the respective guide pins to urge them in an upward direction enable the height of the pins to be adjusted by the screws 30 and 31.

Figure 5:
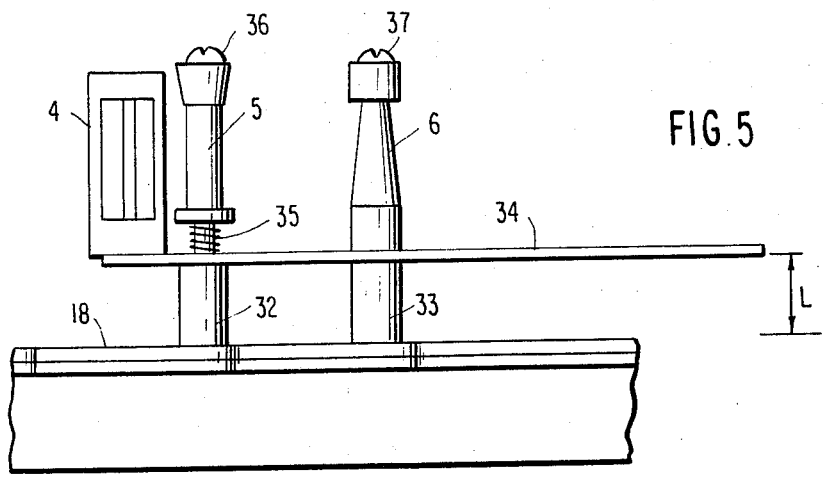
FIG. 5 is an enlarged fragmentary elevation along the line C—C of FIG. 1.

Turning to the left side of the transducer 1, as shown in FIG. 5, it can be seen that the full-width erasing head 4 is supported on a horizontal plate 34 which, in turn, is supported on fixture 18 by means of spacers 32 and 33. To the right of this head the tape guide pin 5 is supported by a long screw 36 which passes down through pin 5a spring 35, plate 34 and spacer 32 into threaded opening 36a in fixture 18. The spring 35 enables the height of pin 5 to be adjusted by turning screw 36. Further to the right the guide pin 6 is secured by a long screw 37 which passes down through pin 6, plate 34 and spacer 33 to be received in threaded opening 37a in fixture 18. Spacers 32 and 33 ensure that the head 4 and pins 5 and 6 will be supported at a height L which is consistent with the need for the tape to follow a downward helical path along guide 14 around housing 1 to the audio components on the other side of housing 1.

Figure 2:
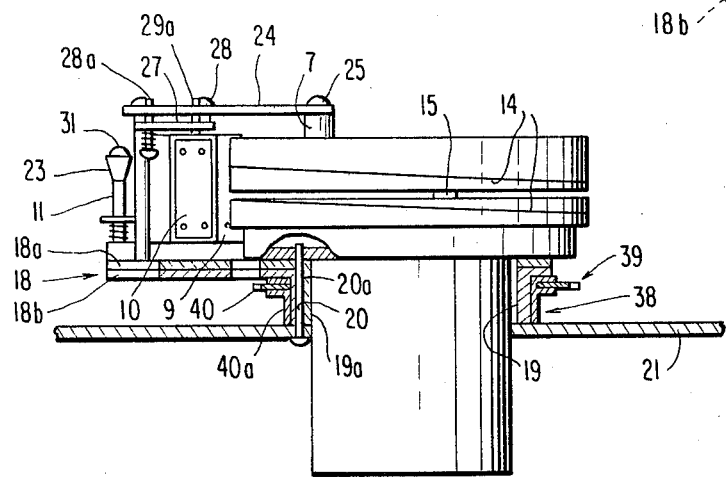
FIG. 2 is a sectional elevation taken along the line A—A of FIG. 1.
Figure 6:
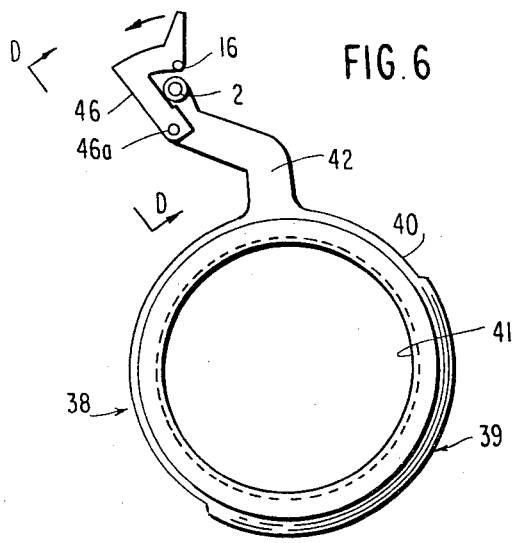
FIG. 6 is a plan view of a ring shaped support for one of the tape loading members.
Figure 7:
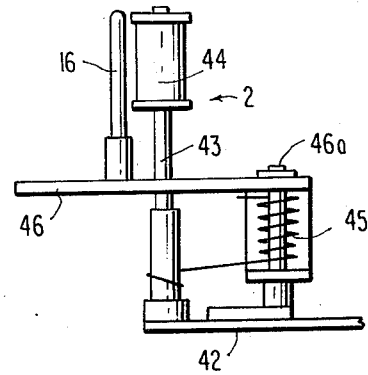
FIG. 7 is an enlarged fragmentary elevation along the line D—D of FIG. 6.

FIGS. 6 and 7 show a loading ring, indicated generally by numeral 38, which supports the left-side portion of the tape loading mechanism comprising the take-out pin 2 and a guide pin 16 to prevent frictional engagement between tape portions moving toward and away from pin 2. Ring 38 includes a plate 40 provided along a portion of its outer circumference with gear teeth 39 for engagement with a driving gear (not shown). Plate 40 is formed with a molded plastic cylindrical downwardly extending hub portion 40a having an inner surface 41 which rotatably fits the lower cylindrical portion 19 of fixture 18, the lower margin of hub 40a being slidably supported on chassis 21 as seen in FIG. 2. The take-out pin 2 comprises a post 43 secured at the outer end of an extension 42 of the ring-shaped plate 40 which supports a roller 44 at its upper-end. The guide pin 16 projects upwardly from a rocking-frame 46 which is pivotally mounted on a shaft 46a which projects upwardly from extension 42. Coil spring 45 mounted on shaft 46a is connected to urge the rocking-frame 46 in a counterclockwise direction against the tension of the contacting tape, as shown by the arrow in FIG. 6.

I claim:

1. In a unitary mounting means for the tape handling components of a video tape recorder of the type wherein magnetic tape is withdrawn from a cassette to be guided during operation by fixedly positioned tape guide means in a path which includes operative engagement with at least one fixed erasing head means and an electromagnetic video transducer means and a return to said cassette, said video transducer means including a cylindrical housing around a portion of the circumference thereof the tape moves in a helical path, the housing also having a lower cylindrical mounting portion to be fixed to a flat chassis member, the combination including:
   fixture means closely encircling the lower cylindrical portion of said housing to be attached to said chassis member for positioning said housing with respect to said chassis member;
   said fixture means including means for supporting first and second erasing heads in predetermined positions which are offset with respect to the axis of said housing;
   means for adjustably supporting a second electromagnetic transducer means on said fixture means adjacent one of said erasing heads;
   means to mount a tape guide means for reciprocable rotary movement concentric with said cylindrical housing between a first position adjacent a cassette and a second position to guide a tape into operative engagement with one of the erasing heads.

2. A mounting means as defined in claim 1, wherein said fixture means is provided with support means to adjustably mount an audio transducing head.

3. A mounting means as defined in claim 1, wherein said fixture means comprises a first horizontal plate provided with pre-positioned openings for mounting said components, and a second horizontal plate disposed in superimposed relationship to the first plate and provided with a depending collar to closely encircle the lower cylindrical portion of said housing, and collar serving to properly space the housing with respect to said chassis member.

4. Fixture means as defined in claim 3, wherein the inner margin of said first horizontal plate includes at least three inwardly directed axially extending ribs having their inner surfaces in slidably frictional engagement with the lower cylindrical surface of the housing.

5. Fixture means as defined in either one of claims 3 or 4, wherein said means to mount said tape guide means for reciprocable rotary movement comprises a generally ring-shaped plate provided with an integrally molded plastic depending collar frictionally encircling the collar of said second plate.

6. Fixture means as defined in any one of claims 1 through 4, wherein an inclined guide member is mounted on said first plate for guiding a pinch roller means in an inclined path while moving between an inoperative position and an operative position in engagement with a capstan means.

* * * * *